(12) United States Patent
Yen et al.

(10) Patent No.: US 7,975,089 B2
(45) Date of Patent: Jul. 5, 2011

(54) COMPUTER DOCK PROVIDING FOR DISCONNECTING MEDIA FROM DOCKING PORT WHEN LOCK IS INSERTED

(75) Inventors: Peter Yen, Houston, TX (US); Wei H Dodd, Taipei (TW); Bart M Downing, Spring, TX (US); Richard J Shepherd, Magnolia, TX (US); James R Herbert, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 48 days.

(21) Appl. No.: 12/436,838

(22) Filed: May 7, 2009

(65) Prior Publication Data

US 2010/0287321 A1 Nov. 11, 2010

(51) Int. Cl.
*G06F 13/00* (2006.01)
(52) U.S. Cl. .......................................... 710/303; 710/304
(58) Field of Classification Search .................. 710/303, 710/304
See application file for complete search history.

(56) References Cited

U.S. PATENT DOCUMENTS

| | | | |
|---|---|---|---|
| 5,862,349 A * | 1/1999 | Cho et al. ........................ | 710/304 |
| 5,933,322 A * | 8/1999 | Ruch et al. .................. | 361/679.41 |
| 5,941,965 A * | 8/1999 | Moroz et al. ................... | 710/303 |
| 6,567,876 B1 * | 5/2003 | Stufflebeam .................. | 710/303 |
| 6,594,721 B1 * | 7/2003 | Sakarda et al. ................ | 710/304 |
| 6,704,808 B2 * | 3/2004 | Kasamatsu et al. ................ | 710/2 |
| 6,804,740 B1 * | 10/2004 | Watts, Jr. ....................... | 710/303 |
| 6,885,552 B2 * | 4/2005 | Mullen et al. ............. | 361/679.41 |
| 6,934,151 B2 * | 8/2005 | Nakano et al. ........... | 361/679.43 |
| 7,079,385 B1 | 7/2006 | Cheng | |
| 7,142,421 B2 | 11/2006 | Cheng | |
| 7,381,079 B2 | 6/2008 | Chuang | |
| 2002/0086703 A1 * | 7/2002 | Dimenstein et al. .......... | 455/557 |
| 2003/0149817 A1 * | 8/2003 | Scott et al. ...................... | 710/72 |
| 2007/0016965 A1 * | 1/2007 | Dan et al. ........................ | 726/34 |
| 2008/0002355 A1 * | 1/2008 | Carnevali ...................... | 361/686 |
| 2008/0150684 A1 * | 6/2008 | Gartner ........................ | 340/5.53 |
| 2009/0187678 A1 * | 7/2009 | Itoh et al. ........................ | 710/20 |
| 2010/0138581 A1 * | 6/2010 | Bird et al. ...................... | 710/303 |

FOREIGN PATENT DOCUMENTS

| | | | | |
|---|---|---|---|---|
| JP | 09006475 | A | * | 1/1997 |
| JP | 2001167038 | A | * | 6/2001 |
| JP | 2002073197 | A | * | 3/2002 |
| JP | 2003022149 | A | * | 1/2003 |
| JP | 2004272597 | A | * | 9/2004 |
| WO | WO 2007067195 | A1 | * | 6/2007 |

OTHER PUBLICATIONS

Hluchy, L.; Balogh, Z.; Gatial, E.; , "Distributed agent-based architecture for management of crisis situations using trusted code execution," Applied Machine Intelligence and Informatics (SAMI), 2010 IEEE 8th International Symposium on , pp. 25-30, 28-30 Jan. 2010.*

* cited by examiner

*Primary Examiner* — Faisal M Zaman

(57) ABSTRACT

A computer dock has a lock slot and media on which driver code is encoded. When a lock is inserted into the slot, it causes a switch to open so as to disconnect the media from a docking port of the dock. When the lock is not inserted into the slot, the media is connected to the docking port.

15 Claims, 4 Drawing Sheets

COMPUTER DOCK PROVIDING FOR DISCONNECTING MEDIA FROM DOCKING PORT WHEN LOCK IS INSERTED

BACKGROUND

Generally, laptops and other portable computers achieve portability at the expense of performance, connectivity, and ergonomics associated with desktop or workstation counterparts. Some users employ a two-computer solution, using a desktop in one location and a laptop elsewhere. However, this solution often involves synchronizing data between two computers, which can be inconvenient and sometimes results in accidental data loss.

Some laptops obviate the need for a desktop by providing sufficient connectivity for peripherals such as printers, monitors, networks, and external hard drives. However, connecting and disconnecting such peripherals one by one can be tedious and cause wear and tear on all the connectors involved.

Computer docks permit a laptop to connect to multiple peripherals using a single connection between the laptop and a dock, to which the peripherals remain connected while the laptop is on the road. Many docks have proprietary connectors for handling the data for the various connected peripherals. However, with the increased data handling capabilities of USB (Universal Serial Bus) 2.0 and the upcoming USB 3.0, docks that connect with computers over USB are increasingly prevalent.

DETAILED DESCRIPTION

The inventors recognized that docks and especially docks with USB or other non-proprietary docking connectors could provide unauthorized access to peripherals (including a network and networked peripherals) and data (e.g., on a hard drive attached to the dock). Likewise, an unauthorized person could steal the dock. To prevent the dock from being stolen, it can be physically secured to a fixture (such as a desk) via a lock such as a Kensington or Kensington-compatible lock. To this end, the dock can include a slot for the lock.

The dock described herein includes media for storing driver code that provides for installing a driver for the dock on a computer. However, this media is not accessible while the dock is physically secured by the lock. When the lock is inserted into the matching slot, the media is disconnected from a docking port so that a connected computer cannot access the driver code on the dock. Thus, computers that have had access to the dock while it was not physically secured can use the dock to access peripherals. Other computers can connect to the dock, but cannot install the driver. As a result, their access to peripherals through the dock will be restricted or prohibited.

Figure 1:
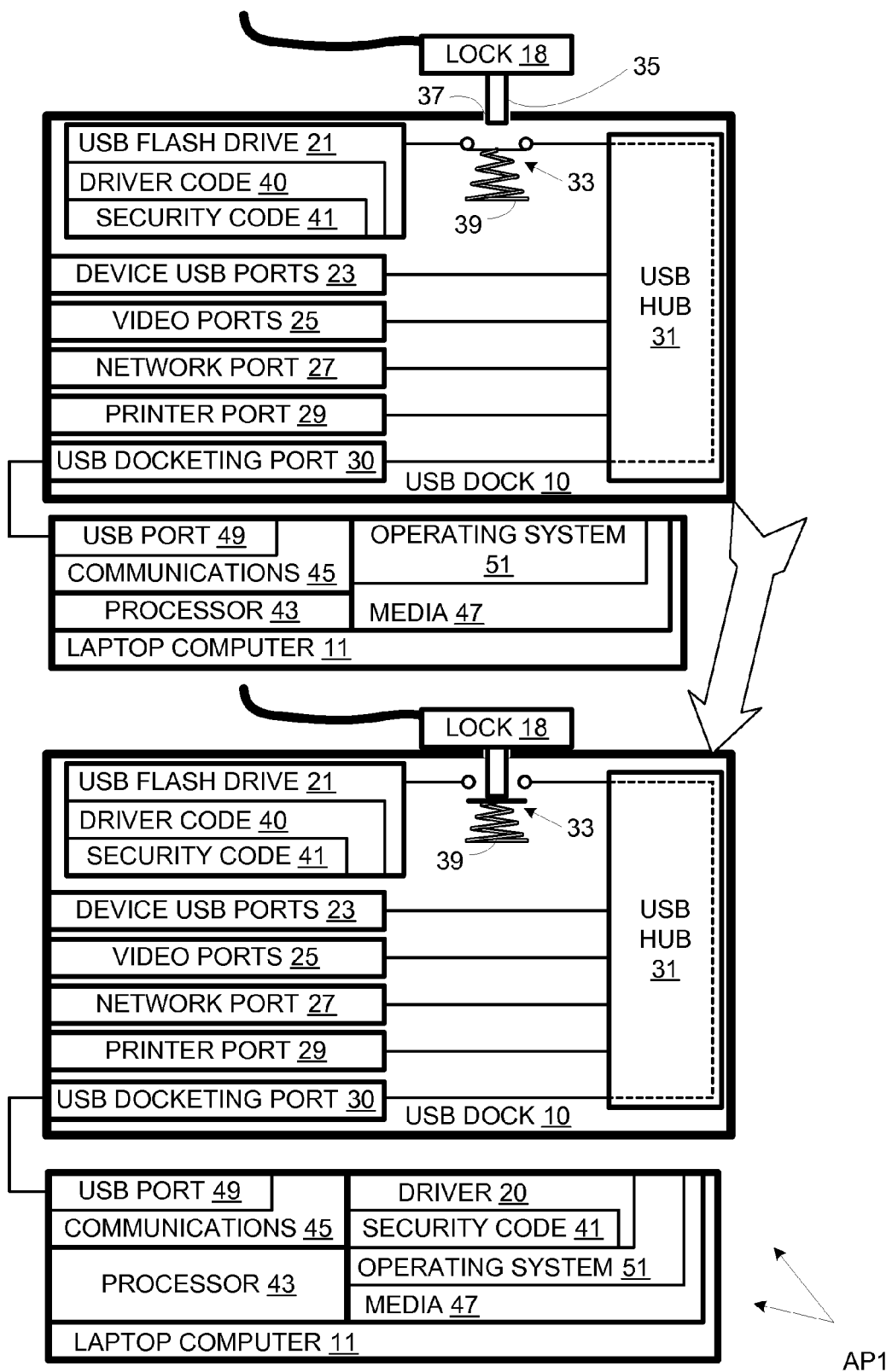
FIG. 1 is a schematic diagram showing before and after conditions of a computer system including a computer dock in accordance with an embodiment of the invention.
Figure 2:
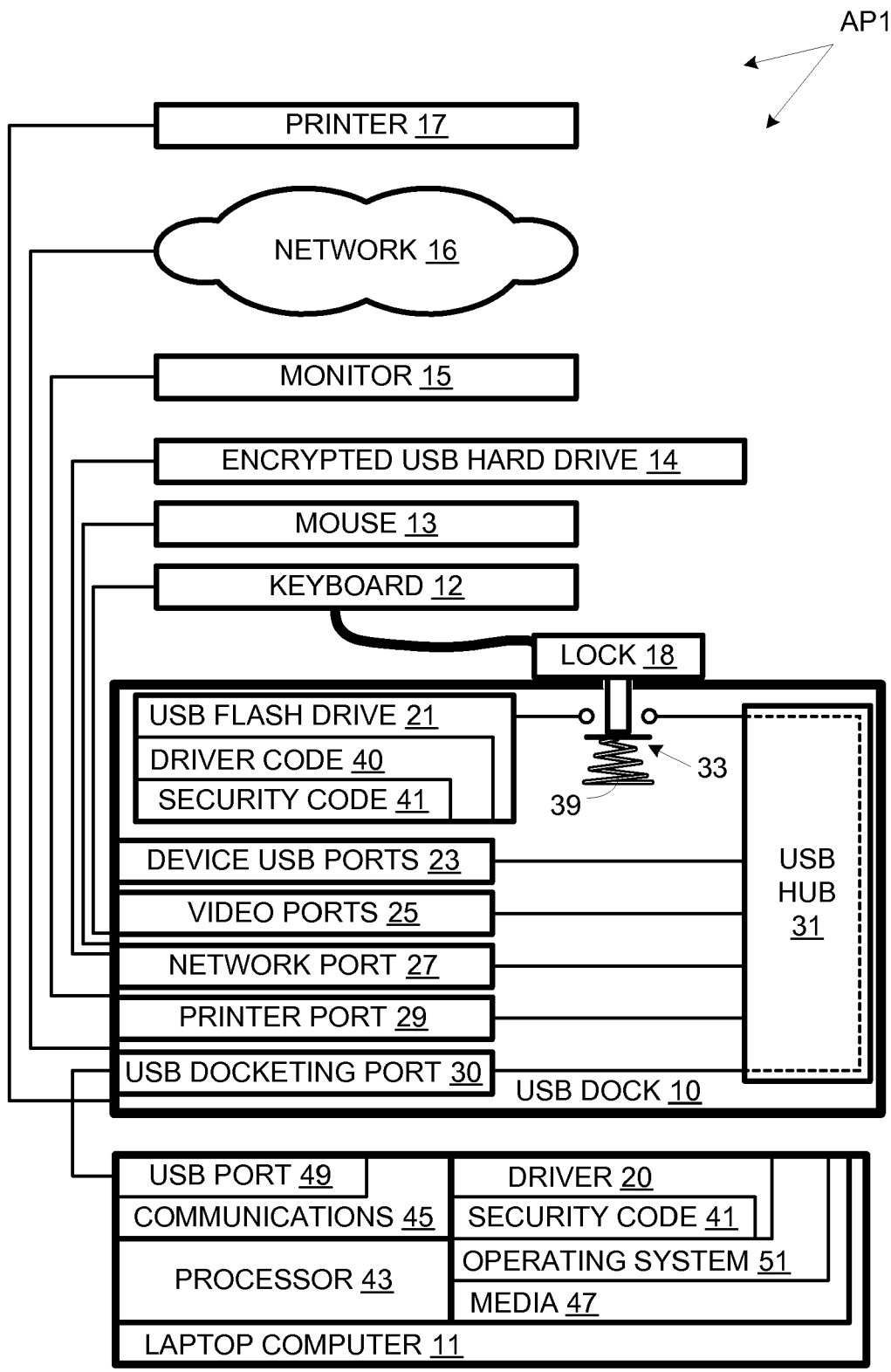
FIG. 2 is a schematic diagram of a computer system including the dock and computer of FIG. 1, with peripherals connecting to the dock.

As shown in FIGS. 1 and 2, a computer system AP1 includes a USB dock 10, a laptop computer 11, and peripherals 12-17 (FIG. 2), and a lock 18. FIG. 1 represents system AP1 before (above) and after (below) a driver 20 is installed from USB dock 10 to laptop 11. USB dock 10 includes a USB flash drive 21, device USB ports 23, a video port 25, a network port 27, a printer port 29, and a USB "to-host" docking port 30. In addition, dock 10 includes an internal USB hub 31 that connects flash drive 21 and ports 23-29 to docking port 30. In alternative embodiments, the provided ports can vary, e.g., they can include multiple video ports and exclude a non-USB printer port.

Dock 10 also includes a switch 33. Switch 33 is a normally closed switch so that USB flash drive 21 and hub 31 are normally connected, in which case USB flash drive is connected to docking port 30 and thus to a computer connected to docking port 30. When lock 18 or, more precisely, the functional shaft 35 thereof, is inserted into a compatible (Kensington) slot 37, it forces switch 33 into an open condition, disconnecting flash drive 21 from hub 31, docking port 30, and any connected computer. In the process, a spring 39 of switch 33 is compressed (as shown in the lower portion of FIG. 1). When lock 18 is subsequently removed, the force of spring 30 urges switch 33 back into its closed condition, reconnecting flash drive 21 to hub 31, docking port 30, and any connected computer. Flash drive 21 serves as computer-readable storage media and has encoded thereon computer-readable and executable code including driver code 40, which in turn includes security code 41. In some alternative embodiments, the driver code does not include security code.

Note that while switch 33 is depicted as a mechanical switch, other switches use other technologies that can provide the same functionality. For example, the switch can be a relay or transistor-based switch. In the latter case, the lock shaft can serve as a conductor tying a contact to ground so as to turn off a transistor that otherwise would couple a flash drive to a docking port.

Laptop computer 11 includes a processor 43, communications devices 45, and computer-readable storage media 47. Communications devices 45 include a USB port 49. Media 47 has encoded thereon code including code constituting an operating system 51. When operating system 51 interacts with driver code 40, driver 30 can be installed on laptop 11 if it has not already been.

However, such installation cannot occur when lock 18 is inserted into slot 37, which is the normal situation when dock 10 is tethered to a fixture such as desk 53 (FIG. 2) via a cable 55 of lock 18. Thus, computers that were connected to dock 10 while it was not secured by lock 18 can use dock 10 and peripherals 12-17. Other computers have such use not enabled, restricted, or prohibited. In alternative embodiments, some access is provided with restrictions. The impact is that a user or administrator with control of lock 18 can also control which computers can access peripherals via dock 10.

Some embodiments permit user control to be circumvented by obtaining a driver from another source, e.g., downloading from a web site or installing a driver from a similar dock. The switch described below provides security code 41 so that access by computers with a similar driver but either lacking a security code or having a different security code can be restricted or prohibited. In an alternative embodiment, the security code is a hardware code, e.g., a MAC (Media Access Control) address, rather than a software security code.

Figure 3:
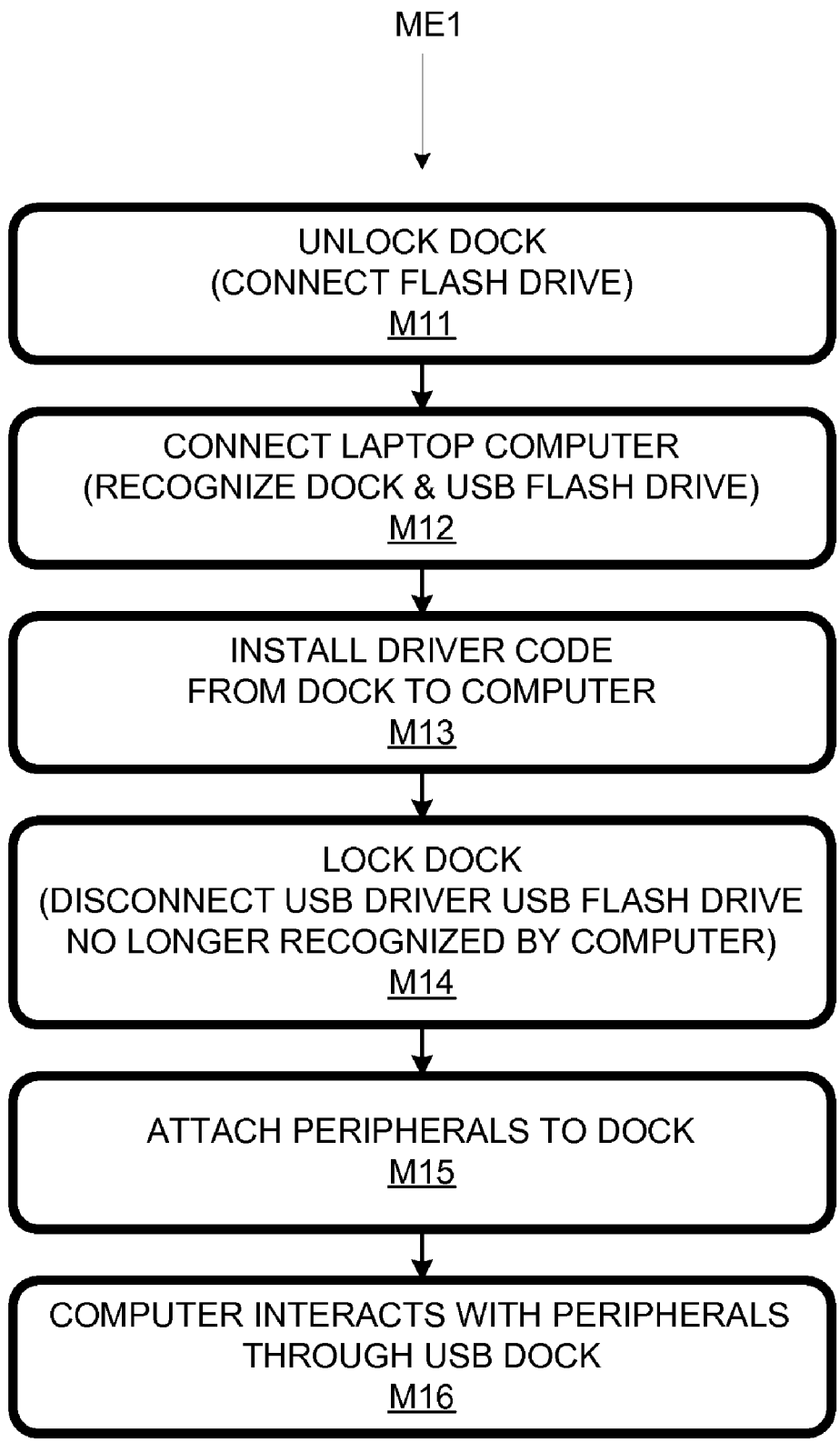
FIG. 3 is a flow chart of a portion of a method that can be practiced in the context of the system of FIG. 1.
Figure 4:
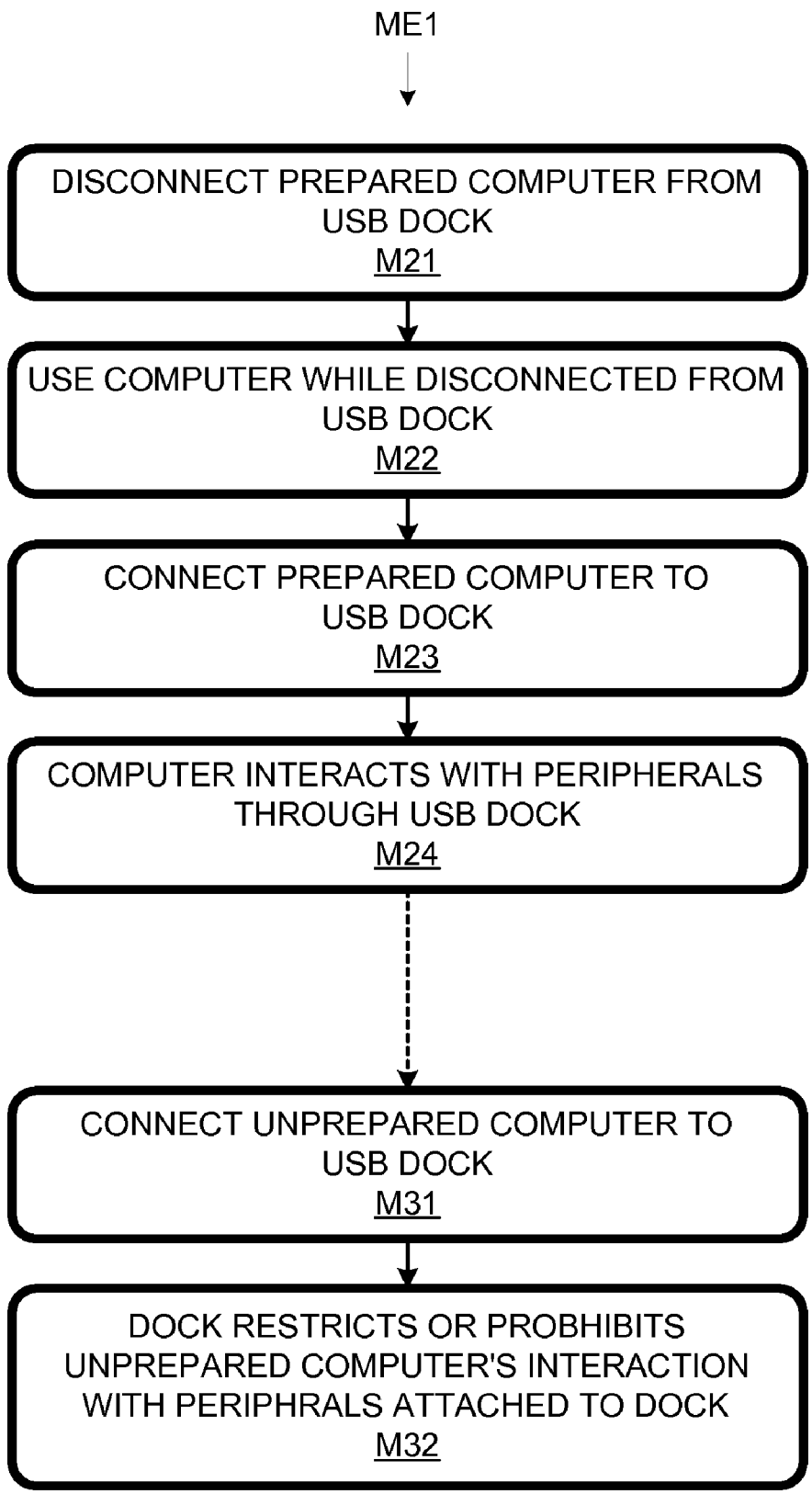
FIG. 4 is a flow chart of another portion of the method of FIG. 3.

System AP1 provides for implementation of a method ME1, flow charted in FIGS. 3 and 4. Referring to FIG. 3, method segment M11 involves causing a dock to be unlocked. This can involve leaving an unlock dock unlocked or removing a lock from a locked dock. For example, lock 18 can be removed or left off dock 10. As a result, media is connected to a docking port; for example, flash drive 21 is connected to docking port 30.

At method segment M12, a computer can be connected to the dock; for example, laptop 11 can be connected to dock 10 via docking port 30. This allows the computer to recognize the dock media; for example, when laptop 11 is connected to dock 10 (while dock 10 is unlocked), flash drive 21 is mounted on laptop 11. Note method segment M12 can occur before or after method segment M11. In the former case, the computer cannot recognize the dock media until the dock is unlocked. The state resulting from method segment M12 is represented in the upper portion of FIG. 1.

Method segment M13 involves installing a driver onto the docked computer. This involves the computer's operating system interacting with driver code 40 so that driver 20 is installed. Security code 41 is copied to driver 20 at this point as well. This installation is possible because laptop 11 is connected to flash drive 21 via USB port 49, docking port 30, and internal dock USB hub 31.

Method segment M14 involves locking the dock. This generally involves mechanically engaging the lock with the dock. Typically, the lock is mechanically attached to or tethered to a fixture, such as a desk. For example, lock 18 can be attached to desk 53 and dock 10 can be locked by inserting lock 18 into slot 35 and engaging the locking mechanism. The computer can be docked or, if it has been removed, undocked at this point. The resulting state is represented by the lower portion of FIG. 1.

Method segment M15 involves attaching peripherals to the dock. This would typically involve using connectors other than the docking connector. The other connectors can be USB ports, video ports, printer ports, network ports, etc. Note that some "peripherals" can be built into the dock, such as an optical disk drive, flash memory slots, etc. The order in which method segment M15 falls in relation to method segments M11-M14 can vary from scenario to scenario. However, it would generally precede method segment M16, which provides for the computer interacting with peripherals via the dock.

In some scenarios, method ME can continue with method segment M21, shown in FIG. 4. This method segment involves removing the "prepared" computer from the dock. For example, laptop 10 is "prepared" once driver 20 has been installed in operating system 51. At method segment M22, the prepared computer can be operating while not connected to the dock. At method segment M23, the computer can be reconnected to the dock. Assuming the dock is locked in position, the computer will not be able to "see" the flash drive. However, it will be able to interact with peripherals via the dock at method segment M24.

At method segment M31, an unprepared computer is connected to the dock. For example, this method segment can refer to laptop 11 before driver 20 was installed. Alternatively, it can refer to some other computer that lacks driver 20. As a result, the unprepared computer fails to interact fully with the dock and the peripherals. This can be because some functionality requires a driver or because dock 20 actively restricts or prohibits some interactions when driver 20 is lacking. This is especially the case where a security code is used for access. Examples include a code used for network recognition or for decrypting encrypted data on a hard disk peripheral such as hard disk 14 (FIG. 2).

For embodiments employing a USB dock, the USB standard involved can be USB 2.0 or later. USB 3.0 brings increased performance and therefore support for more dock connections. For other embodiments, other connection can be used for the docking port, including Firewire (IEEE 1394), E-SATA, and proprietary connections. Also, different physical locking systems can be used. For example, some docking stations provide locking engagement with a mating computer. These and other variations upon and modifications to the illustrated embodiment provided for by the following claims.

What is claimed is:

1. A system comprising:
   a computer dock having computer-readable storage media, a docking port for connecting to a computer, and a non-docking port for connecting to a peripheral, said docking port being communicatively coupled to said non-docking port, said computer-readable storage media storing computer-xecutable driver code, said dock including a switch for selectively connecting and disconnecting said computer-readable storage media from said docking port, said dock including a lock slot arranged with respect to said switch so that
   when a lock is not inserted into said slot, said switch connects said computer-readable storage media to said docking port, and
   when said lock is inserted into said slot, said switch causes said computer-readable storage media to be disconnected from said docking port while said non-docking port is communicatively coupled to said docking port.

2. A system as recited in claim 1 wherein said computer-readable storage media is incorporated in a USB flash drive and said docking port is a USB port.

3. A system as recited in claim 1 wherein said driver code provides for installing a driver for said dock on a computer connected to said docking port while said lock is not inserted into said slot.

4. A system as recited in claim 3 wherein said dock prohibits or restricts interactions between a computer connected to said docking port and at least one peripheral connected to said non-docking port if and only if said computer does not have said driver installed.

5. A system as recited in claim 3 wherein said driver code includes security code so that when and only when said security code is installed on said computer, said computer can decrypt encrypted data on a hard drive connected to said non-docking port.

6. A system as recited in claim 1 wherein, when said computer is connected to said docking port while said lock is inserted in said slot, said computer-readable storage media cannot be recognized by said computer.

7. A system as recited in claim 1 wherein said dock includes plural non-docking ports other than said docking port.

8. A system as recited in claim 7 wherein said non-docking ports include at least one USB port other than said docking port and at least one non-USB port.

9. A method comprising:
   connecting a computer to a computer dock via a docking port of said dock;
   installing driver code for said dock from computer-readable storage media included in said dock to computer-readable storage media on said computer; and
   physically securing said computer dock by inserting a lock into said computer dock so that said computer-readable storage media on said dock is disconnected from said docking port.

10. A method as recited in claim 9 further comprising:
    attaching peripherals to said computer dock via ports of said computer dock other than said docking port; and said computer interacting with said peripherals through said computer dock while said lock is inserted into said computer dock so that said media on said dock is disconnected from said docking port.

11. A method as recited in claim 10 wherein said installing: occurs while said lock is not inserted into said computer dock; and is prohibited while said lock is inserted into said computer dock.

12. A method as recited in claim 9 wherein said physically securing involves opening a switch when said lock is inserted into a slot of said dock.

13. A method as recited in claim 9 wherein removing said lock from said slot causes said switch to close.

14. A method as recited in claim 9 further comprising said computer dock prohibiting or restricting interaction between peripherals attached to said dock and a computer on which said installing has not occurred.

15. A method as recited in claim 9 including removing said lock from said dock prior to said installing.

\* \* \* \* \*

UNITED STATES PATENT AND TRADEMARK OFFICE
CERTIFICATE OF CORRECTION

| | | |
|---|---|---|
| PATENT NO. | : 7,975,089 B2 | |
| APPLICATION NO. | : 12/436838 | |
| DATED | : July 5, 2011 | |
| INVENTOR(S) | : Peter Yen et al. | |

It is certified that error appears in the above-identified patent and that said Letters Patent is hereby corrected as shown below:

In column 4, line 15, in Claim 1, delete "computer-xecutable" and insert -- computer-executable --, therefor.

Signed and Sealed this
Twentieth Day of December, 2011

David J. Kappos
*Director of the United States Patent and Trademark Office*